March 26, 1940.   G. A. ULRICH, JR   2,194,919
LOCKING MEANS FOR FABRIC FASTENING DEVICES
Filed March 29, 1938
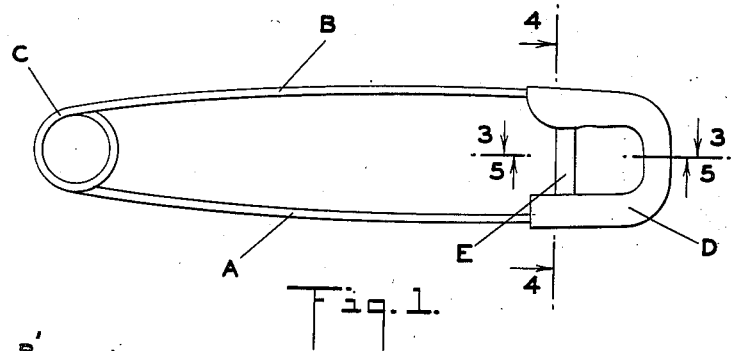
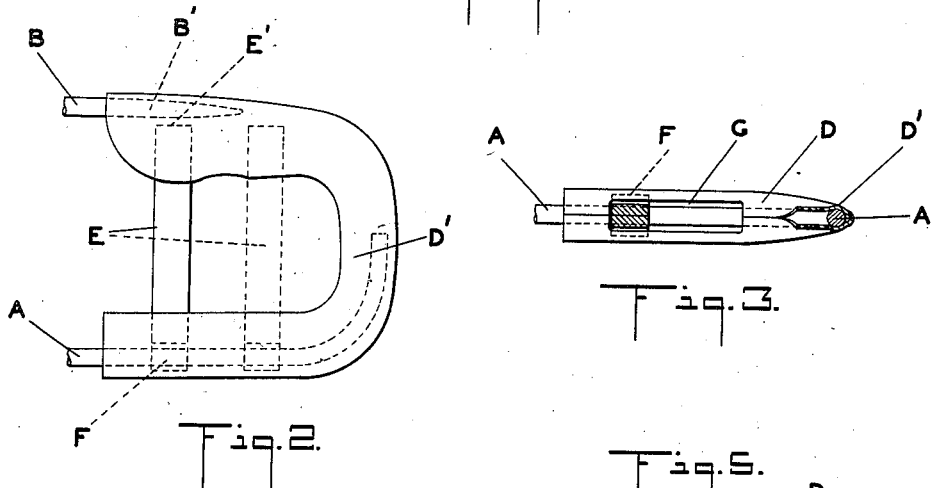
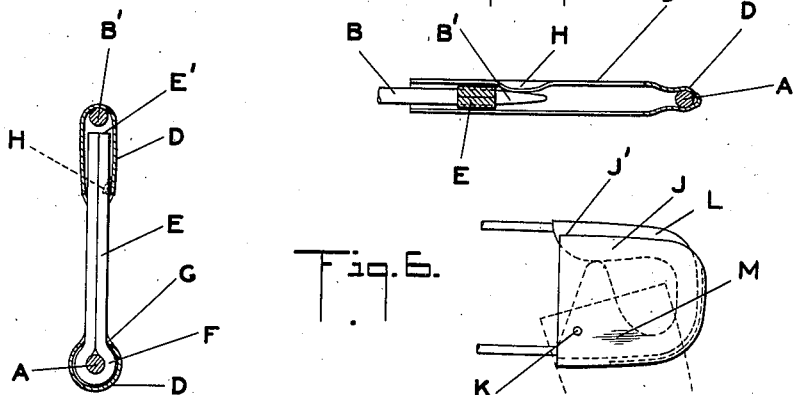
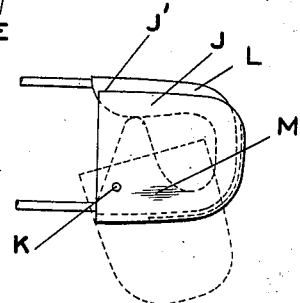
INVENTOR
GEORGE A. ULRICH, JR.
BY
Ralph E. Clayton
ATTORNEY Patented Mar. 26, 1940

2,194,919

UNITED STATES PATENT OFFICE 2,194,919

LOCKING MEANS FOR FABRIC FASTENING DEVICES

George A. Ulrich, Jr., New York, N. Y.

Application March 29, 1938, Serial No. 198,621

2 Claims. (Cl. 24—157)

This invention relates to fabric fastening devices and has more particular reference to devices for preventing the pointed pin member of a safety pin from becoming separated from its keeper or point housing.

The object of the invention is to provide a simplified and efficient lock for such fastening devices.

Comprehensively stated the invention comprises a releasable member adapted to prevent the pointed pin member from separating from its keeper except when deliberately released.

More specifically stated, the invention comprises a movable member arranged at one end of the safety pin so as to leave the conventionally pointed fabric engaging leg of the pin free to perform its intended purpose without hindrance.

While two embodiments of the invention are shown in the drawing accompanying this application and forming part thereof, it is to be understood that such embodiments are merely illustrative of the underlying principles of the invention so as to afford a clear understanding thereof to those skilled in the art and are not intended as limiting the invention to the specific form disclosed therein.

In said drawing:

Fig. 1 is a side elevation of one form of the invention;

Fig. 2 is an enlarged detailed view of a portion of the invention shown in Fig. 1 partly fragmentary;

Fig. 3 is a section of Fig. 1 on the line 3—3;

Fig. 4 is a section of Fig. 1 on the line 4—4;

Fig. 5 is a section of Fig. 1 on the line 5—5; and

Fig. 6 is a modified form of the invention.

Continuing now by way of a more detailed description, a conventional safety pin has two legs A and B extending in the same general direction from the conventional coiled spring portion C, the spring portion C affording flexibility for movement of the legs A and B relatively to each other. A keeper or pin point housing D, of the conventional U-shape, is secured to one end of the leg A by pinching in the material of the keeper at D' to press fit the material of the keeper to the leg A at D' and leave the flanges of the keeper spaced from the leg A to afford clearance for a sliding member to be described. An upstanding slidable-leg-abutting flexible strip or locking member E has its lower end F looped around one end of the leg A which is spaced from the keeper, so as to slide freely relatively thereto. In order to limit the longitudinal movement of the member E and to guide it in a plane parallel to the plane of the pin so as to abut against the end of leg B, the member E guided in a slot G which is conveniently formed by clearing away the edges of the keeper material prior to forming the keeper D as will be readily understood. When the member E is in position shown in full lines in Figs. 1, 2, and 3 its upper end E' abuts against the pointed end B' of the leg B and holds it in position within the keeper D. The member E is prevented from moving longitudinally of the pin by an indent or auxiliary locking means H formed in one of the side walls of the keeper and projecting within its path. This indent is of sufficient depth to securely hold the upstanding member E in proper position against the pointed portion of the pin and to prevent movement of the member E. A light pressure of the finger against the flexible member E is sufficient to push it to a position where it clears the indent H. A light lateral pressure forces the member E, guided by the slot G, to the position shown in dotted lines in Fig. 2. In this position the pointed end B' of the leg B is free to move toward the leg A and can be released from its keeper or housing.

In the modification shown in Fig. 6, an outside sheath J adapted to envelop the conventional keeper is cleared away along its top surface at J' to permit the sheath pivoted at K to be rotated to the position shown in dotted lines in Fig. 6. In this position of the sheath the pointed leg of the pin can be released from its conventional keeper as will be readily understood. When the pin is to be locked, the sheath when turned to full line position prevents the pointed leg from clearing its keeper L. The sheath is snap locked to the keeper K by an indent as at M forming a frictional lock with the rounded portion of the keeper.

It is claimed:

1. A safety pin comprising a movable fabric engaging leg having a pointed end, a substantially U-shaped keeper having spaced side flanges to receive and house the pointed end between them, a second leg having one end fixedly secured to the keeper, and a locking member slidably mounted within the confines of the keeper for alternate positioning beneath and away from said pointed end.

2. A safety pin comprising a movable fabric engaging leg having a pointed end, a U-shaped keeper having spaced side flanges to receive and house the pointed end between them, a second leg fixedly secured to the keeper between said side flanges, said side flanges being brought together at spaced intervals to define a slot, a locking member slidably mounted on said second leg within the confines of the keeper and said slot, and an auxiliary locking means to positively lock said locking member in position to prevent displacement of the pointed end from the keeper.

GEORGE A. ULRICH, JR.